(12) United States Patent
Garimella

(10) Patent No.: US 9,262,619 B2
(45) Date of Patent: Feb. 16, 2016

(54) COMPUTER SYSTEM AND METHOD FOR PROTECTING DATA FROM EXTERNAL THREATS

(71) Applicant: Venkatachalam Garimella, Valrico, FL (US)

(72) Inventor: Venkatachalam Garimella, Valrico, FL (US)

( * ) Notice: Subject to any disclaimer, the term of this patent is extended or adjusted under 35 U.S.C. 154(b) by 0 days.

(21) Appl. No.: 14/531,055

(22) Filed: Nov. 3, 2014

(65) Prior Publication Data

US 2015/0135335 A1    May 14, 2015

Related U.S. Application Data

(60) Provisional application No. 61/903,716, filed on Nov. 13, 2013.

(51) Int. Cl.
*G06F 21/34* (2013.01)
*G06F 21/62* (2013.01)
*H04L 29/06* (2006.01)

(52) U.S. Cl.
CPC .............. *G06F 21/34* (2013.01); *G06F 21/629* (2013.01); *H04L 63/0245* (2013.01); *H04L 63/083* (2013.01); *H04L 63/0853* (2013.01)

(58) Field of Classification Search
CPC ....... G06F 21/34; G06F 21/629; G06F 21/31; G06F 21/62; H04L 63/0245
See application file for complete search history.

(56) References Cited

U.S. PATENT DOCUMENTS

| | | | | |
|---|---|---|---|---|
| 5,748,912 A | * | 5/1998 | Lee ........................ | G06F 1/1616 703/27 |
| 6,202,153 B1 | * | 3/2001 | Diamant .................. | G06F 21/55 726/35 |
| 2002/0166067 A1 | * | 11/2002 | Pritchard .............. | G06F 21/554 726/4 |
| 2003/0097585 A1 | * | 5/2003 | Girard ................... | G06F 21/575 726/19 |
| 2014/0068754 A1 | * | 3/2014 | Burkill .................... | G06F 21/36 726/18 |

OTHER PUBLICATIONS

SiliconUnderground (How difficult is it to guess your password? Jul. 1, 2011, 3pages).*

* cited by examiner

*Primary Examiner* — Saleh Najjar
*Assistant Examiner* — Oleg Korsak
(74) *Attorney, Agent, or Firm* — Jason T. Daniel, Esq.; Daniel Law Offices, P.A.

(57) ABSTRACT

A system and method for protecting data from external threats includes a computer system having a plurality of input/output units, a key device that is removably mated with one of the input/output units, a processor, a local memory, a primary bulk storage device, a secondary bulk storage device, a first communication unit and a second communication unit. A method includes performing software and hardware verification of a first and second user password, and selectively engaging each of the bulk storage devices and communication units when the system is in one of a protected mode and an open mode.

17 Claims, 4 Drawing Sheets

COMPUTER SYSTEM AND METHOD FOR PROTECTING DATA FROM EXTERNAL THREATS

CROSS-REFERENCE TO RELATED APPLICATIONS

This application claims the benefit of U.S. Application Ser. No. 61/903,716 filed on 13 Nov. 2013, the contents of which are incorporated herein by reference.

TECHNICAL FIELD

The present invention relates generally to the field of data protection, and more particularly to an improved computer system for protecting data from external threats, and a method of operating the same.

BACKGROUND

The statements in this section merely provide background information related to the present disclosure and may not constitute prior art.

Every time a computer connects to the internet, it is in danger of being exposed to malicious activities such as malware, spying, hacking etc. It is also true that internet access is a necessity for conducting daily activities of a business and personal nature. For an individual, personal information needs protection. For companies, spying or malware are a constant problem to contend with. Generally, companies spend millions of dollars and time to devise ways to protect their digital files and other such information that is under their control.

To combat information theft, some work places isolate particular computers, such as bank teller terminals, for example, from accessing the internet. However, other computers at such institutions (e.g., internet banking) require a connection to the internet.

In this regard, there are many known methods for preventing unauthorized access and data loss. Several conventional steps involve the use of passwords, anti-malware programs, computer history and tracking deletion programs, and virus protection programs. Although these methods and programs provide some level of protection, there are many new reports of unauthorized access and data loss each year.

With regard to the above noted software solutions, the conventional means of activating the same is to utilize a password. This password is compared in software and once verified provides the password holder with full access to the system and its defense programs. In this regard, most conventional passwords must be short enough for a user to remember and enter each time. Unfortunately, passwords consisting of between 6 and 8 characters can be easily cracked by a hacker with a sufficient computing power and, once the unauthorized user obtains the password, they can take full control and lock out the authorized user and/or change the computer defense systems. However, longer passwords have their own risks because they are extremely difficult to remember, thus causing many users to write them down in a place that can be easily found by others.

To solve all these inconveniences contained in the state of the art, the present invention provides a novel system and method for protecting data from external threats, as outlined in the following description.

SUMMARY OF THE INVENTION

The present invention is directed to a system and method for protecting data from external threats.

One embodiment of the present invention can include a computer system having a plurality of input/output units for receiving a first user supplied password, and a second, more complex user password that is contained on a physical key device. The first user password can be authenticated by software and/or hardware, and the second user password can be authenticated by a hardware control unit.

The computer system can also include a plurality of bulk storage devices and communication units which can be selectively enabled and disabled by the hardware control unit in order to limit access to the bulk storage units and/or a secure network.

Another embodiment of the invention can include a method for successfully gaining physical access to the system utilizing the above described user passwords and physical key.

Yet another embodiment of the invention can include a method of operating the system in one of a protected mode and an open mode.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
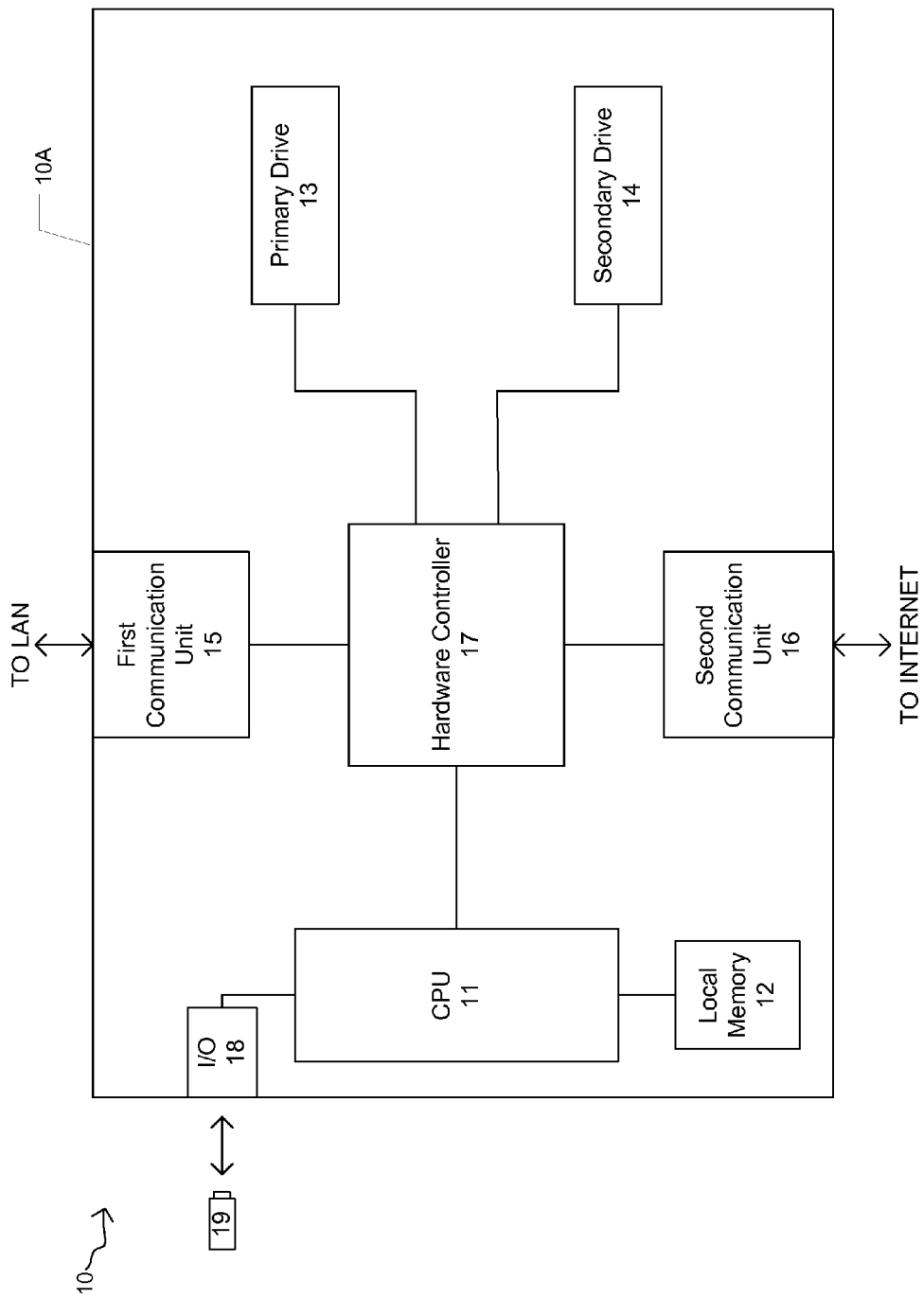
FIG. 1 shows an exemplary block diagram of a computer system for protecting data from external threats, in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure.

Various embodiments of a system and method for protecting data from external threats shall be described herein. As will be apparent to those of skill in the art, the below described embodiments are set forth to provide a basic understanding of the presently claimed invention, and are not intended to be limiting in any way, as many modifications and variations to the device and/or various method steps are also contemplated.

FIG. 1 illustrates an exemplary block diagram of a computer system for protecting data from external threats. For the sake of clarity, only those components necessary to demonstrate the below described methodology are illustrated. As such, it is to be understood that any number of additional peripheral components can also be provided with the system.

In one embodiment, the computer system 10 can include a main body 10a having at least one processor 11 that is conventionally connected to local memory 12, a primary bulk storage device 13, a secondary bulk storage device 14, a first communication unit 15, a second communication unit 16, a hardware control unit 17, and at least one input/output unit 18, capable of interacting with a physical key 19.

The main body 10a can function to house the computer system components in a conventional manner, so as to create a single device. In this regard, the main body 10a can take any number of different shapes and sizes, and can be constructed from any number of different materials utilizing known construction techniques.

The processor/CPU 11 can act to execute program code stored in the system memory, in order to allow the device to perform the functionality described herein. The construction, use and operation of one or more processors within a computer system is extremely well known in the art, therefore no further description will be provided.

The local memory 12 can act to store operating instructions in the form of program code for the processor 11 to execute. Although illustrated in FIG. 1 as a single component, memory 12 can include any number of different physical components of various shapes, sizes and capacities. As used herein, local memory can refer to random access memory or other non-persistent memory device(s) generally used during actual execution of program code, whereas the below described bulk storage devices can be implemented as persistent data storage devices. Additionally, memory 12 can also include one or more cache memories that provide temporary storage of at least some program code in order to reduce the number of times program code must be retrieved from the bulk storage device during execution. Each of these devices is well known in the art.

Each of the primary and secondary bulk storage devices 13 and 14 can include any type of persistent storage devices such as a hard disc drive, for example, and without limitation. In this regard, each of the drives can include identical components or can include different components depending on the intended use of the system. In either instance, it is contemplated that the primary drive will be the unit designated to receive and store any and all programs and program data which is to be protected against disclosure to unauthorized users, and the secondary drive will be utilized for programs requiring internet access.

As will be described below, the system can transition between a protected mode in which access to the internet is disabled, and an open mode, wherein access to the internet is enabled. As such, one preferred embodiment of the system 10 can include a first communication unit 15 that can be encoded with instructions to serve as a dedicated connection between the system and a secured network such as Local Area Network (LAN), for example, and a secondary communication unit 16 that can be encoded with instructions to serve as a dedicated connection between the system and a less secure/insecure network such as the internet, for example.

As described herein, each of the communication units can include any type of device/network adapter that is capable of facilitating communication between two computing devices. Several nonlimiting examples include wireless Modems, cable modems, Ethernet cards, WAN and LAN adapters, cellular modems and the like. Operation of the primary and secondary network adapters can be controlled via the processor and/or the hardware control unit 17 described below.

The hardware control unit 17 can function to limit access to each of the primary drive 13, the secondary drive 14 and/or each of the network adapters 15 and 16. Additionally, the hardware controller can also function to switch the system between the below described protected and open modes thereby creating a time-slice mechanism in order to prevent a malicious program from tying up the system.

As described herein, the hardware control unit 17 can include any type of mechanism capable of acting as a gatekeeper for granting and denying access to system components based upon the below described methodology. In the preferred embodiment, the hardware control unit 17 can include hardware, such as a Field-Programmable Gate Array (FPGA) or a Complex Programmable Logic Device (CPLD), for example.

One or more input/output unit(s) 18 can be provided that are capable of communicating with one or more of a user and the physical key 19 described below. In this regard, one input/output unit can include a conventional keyboard, for example that is configured to receive a first password from a user. Another input/output unit can include any number of known components such as a memory card reader, a USB port, and/or a CD/DVD read and write, among many others which can function to receive a second password from the below described key. In the instance where a CD/DVD read and write system is utilized, the system can include any number of additional components and/or logic elements in order to prevent duplication of physical keys. Of course the input/output unit(s) are not limited to the above described components, as it is contemplated that any number of proprietary interfaces can also be incorporated into the system.

The physical key 19 can include any number of portable storage devices such as a CD ROM, an SD card, and/or a USB memory device, for example, which is capable of storing a password/passphrase and communicating the same to the hardware control unit 17 via the input/output unit 18. As will be described below, the physical key can function as a dongle which can prevent the system from operating unless established security protocols have been satisfied.

Various methods for protecting data from external threats utilizing the system 10 will now be described. As with the system, it should be apparent to those of skill in the art that any number of variations to the below described methodology are also possible without deviating from the scope and spirit of the inventive concepts described herein. To this end, the below method steps are not to be construed as limiting.

Figure 2:
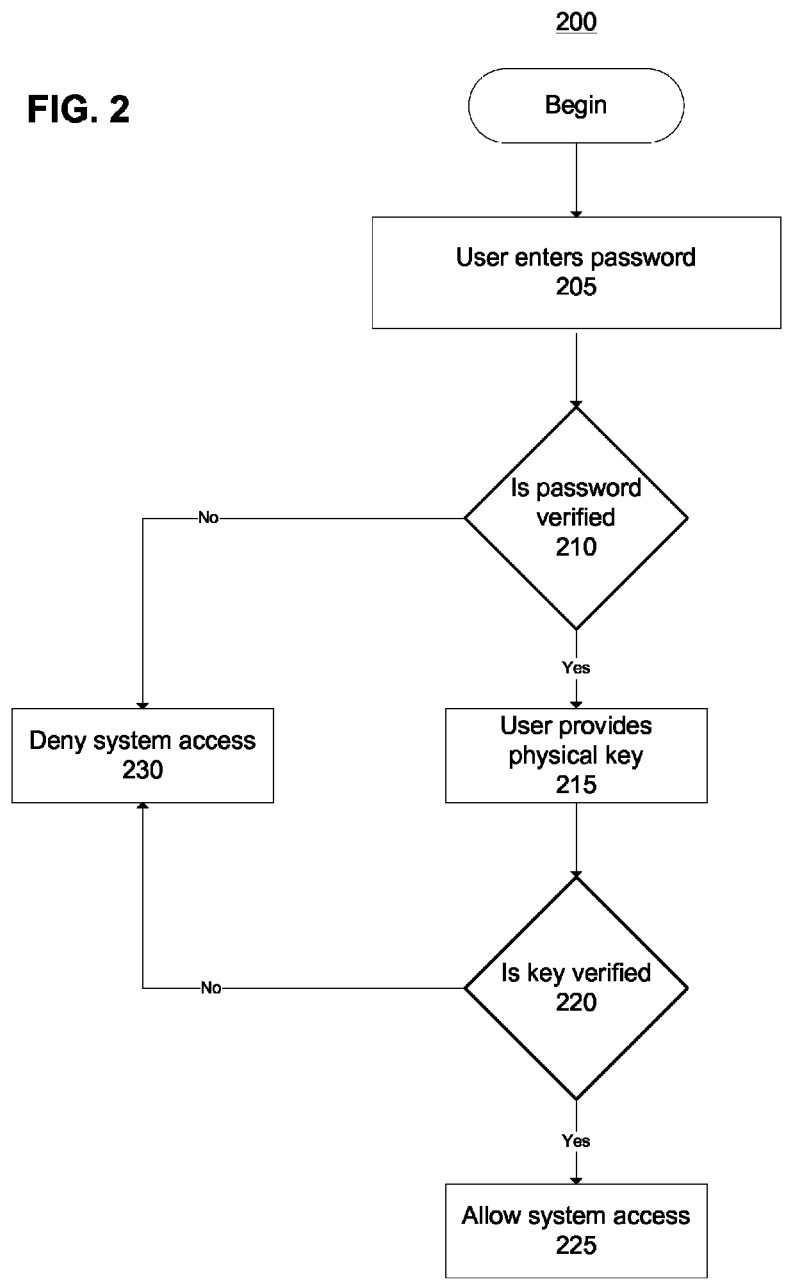
FIG. 2 shows an exemplary flow diagram illustrating a method for protecting data from external threats, in accordance with one embodiment of the invention.

The longer and more complex that a password is, the more difficult it is to break. In this regard, FIG. 2 shows an exemplary flow diagram illustrating a method for accessing the contents of the system utilizing a two-stage password scheme. The method can begin at step 205 wherein a system user can manually key a traditional password, such as a 6-8 character password, for example, that can be verified by the system (step 210) in a traditional manner. Next, the method can proceed to step 215, where the user can provide the physical key 19 having a second and much more complex password to the system. The system can then utilize the hardware control unit 17 to verify the key (step 220), before allowing access to the primary or secondary drives in step

225. Should either of the verification steps fail, the system can deny the user access in step 230. In this regard, and as will be described below, the first password functions only to allow the system to authenticate the user supplied second password that is contained on the physical key. As such, the user need only remember a standard shortened password to gain access to the system, so long as he or she is in physical possession of the key 19. Such a feature is advantageous because there are many known software programs that are designed to crack these shortened passwords (i.e., the first password), but no such program can crack the physical key for the reasons discussed below. Moreover, should either password fail, the system cannot be accessed, thereby providing a strong and redundant security measure.

As described herein, the second password contained on the physical key can initially be established by a user, and can include virtually any type of digital item and/or media that can be stored on the physical key. Several nonlimiting examples can include a news article, a long passage from a book, a picture, and/or a complex alphanumeric code/sequence of characters, for example. In this regard, it is preferred that the second password contains a minimum of 128 bytes, but longer passwords can also be acceptable.

The second password can be copied into the system and onto the key 19. When utilizing the key to access the system, the hardware control unit can compare the stored complex passwords, bit by bit, and provide a go or no go indication (for example generate a NMI if it is a no go).

By providing the complex password in the dongle, and requiring the dongle to physically mate with the hardware control unit, the user is provided with a physical component which must be presented in order to gain system access, thereby preventing remote access to the computer. Additionally, the dongle can be quarried at random times to continue the system use. This action can be done without explicit user intervention.

In the preferred embodiment, the secondary password, when created, can be written to the hardware controller 17, such as the above described FPGA or a CPLD, for example. As such, the key 19 can directly communicate with the hardware controller, without requiring software password verification. The FPGA, for example, can be configured to only access and read the contents of the key upon successful system verification of the first password. In the instance where the first password and/or the second password do not match, the system can generate a Non Maskable interrupt or a reset or some other way of disabling access to the system.

As such, by handling the second password through hardware, there is no opportunity for external software to force the system to ignore failed password comparison. If they match, after a few seconds default time, settable by user, the system can start normal operation. As described herein, it is preferred that the contents of the FPGA are not readable by the system. In this regard, in the unlikely event that an unauthorized person gains access to the system, they will be unable to find the second password. Moreover, it is preferred that the system include functionality for determining whether the key is present at all times (i.e., physically connected to the I/O unit). If the key is removed, the system shall behave as if the login failed.

In one embodiment, the method can include functionality for preventing system access utilizing a duplicate or copied key. In this regard, when the secondary password is created, using a USB memory device, a CD or other such device, a time stamp can be added to the password. The information can be first written to the FPGA which then is written to the Key. Thus only one key is valid because a second key would have a different time stamp and only that Key having the time stamp that matches the FPGA will be considered valid.

By providing a time stamp, or other means for synchronizing files, the system can prevent someone from creating a duplicate password key. Moreover, by requiring that the key 19 be made on the actual system 10 for which it is to be used, the keys cannot be interchangeable among several systems. As such, if a key is lost, another key can be made by the user, and because of the timestamp, the earlier key will no longer be usable. Accordingly, in the unlikely event that a physical key 19 is lost, the person that finds it would need to know which system the key is mated with, as well as the original users' first password. As a further precaution one may remove the picture or passage used to create the password from the system after the key is made. However, in all instances, the logic imparted onto the key will allow the key to be read only by the system which made the key. Such a feature prevents anyone from taking a key and duplicating it outside of the system.

By providing both a primary and secondary password scheme utilizing a physical key, the system 10 can be extremely difficult for an unauthorized user to access. Moreover, because the system requires the key 19 be physically connected to the system during use, remote access without the user's knowledge is not possible. Moreover, for a legitimate user, the second password is easy to manage and can be changed as often as needed.

In addition to the above described user verification method, the system 10 can also include functionality for preventing remote users from accessing system components through a network such as the internet, for example. In this regard, the hardware controller 17 can function as a switch that physically isolates one or more system components. As such, the system 10 can be configured to operate in two distinct modes, "protected mode" and "open mode".

Figure 3:
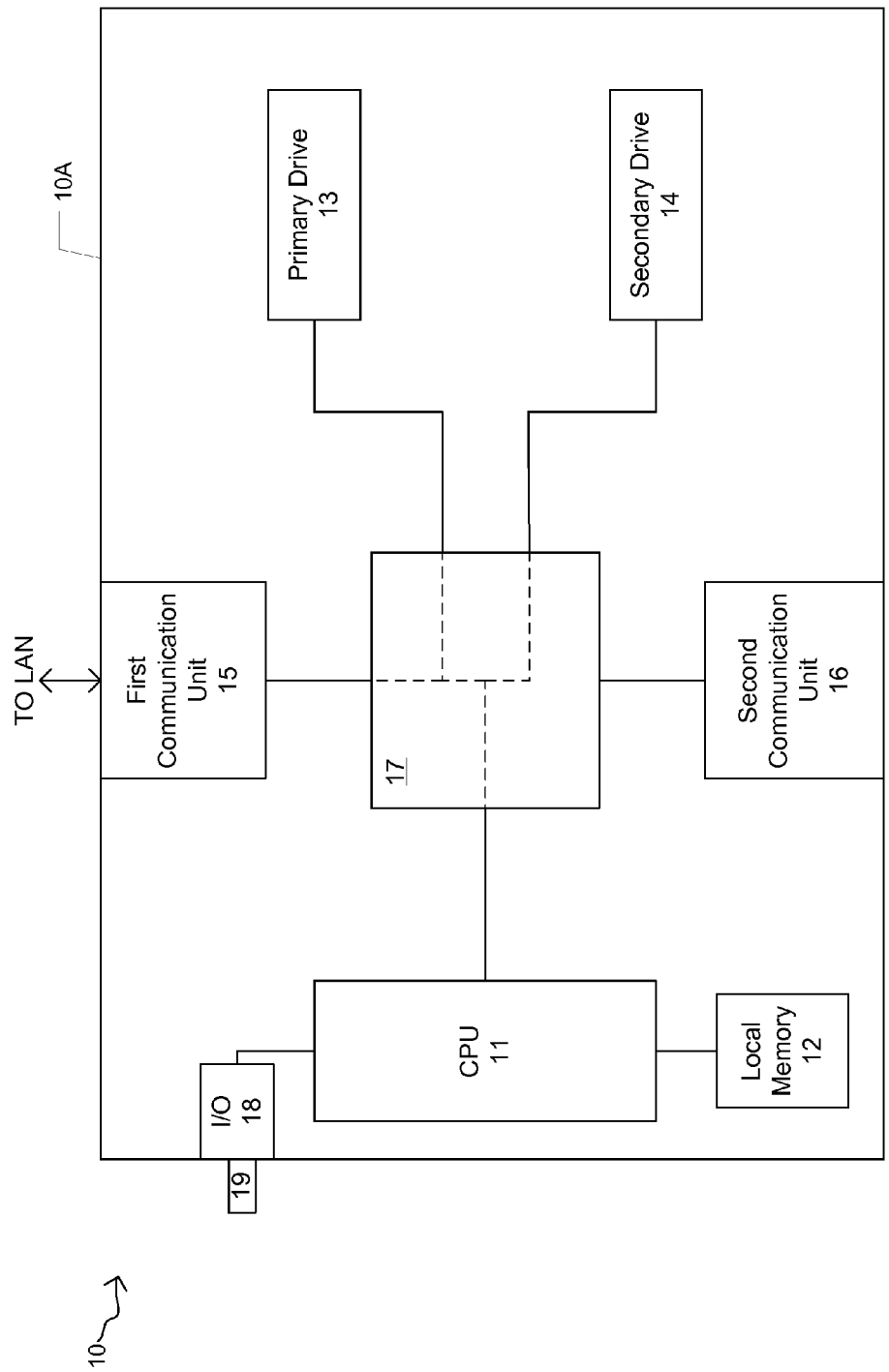
FIG. 3 shows an exemplary block diagram of the computer system of FIG. 1 operating in a protected mode, in accordance with one embodiment of the invention.

FIG. 3 illustrates one embodiment of the system 10 operating in a protected mode, wherein each of the primary drive 13, the secondary drive 14 and the first communication unit 15 can be enabled by the hardware controller 17, so as to allow a verified system user complete access to a secured network, such as a company LAN, for example. However, when the computer is in protected mode, the second communication unit 16 is disabled and no access to a less secure network is possible.

Figure 4:
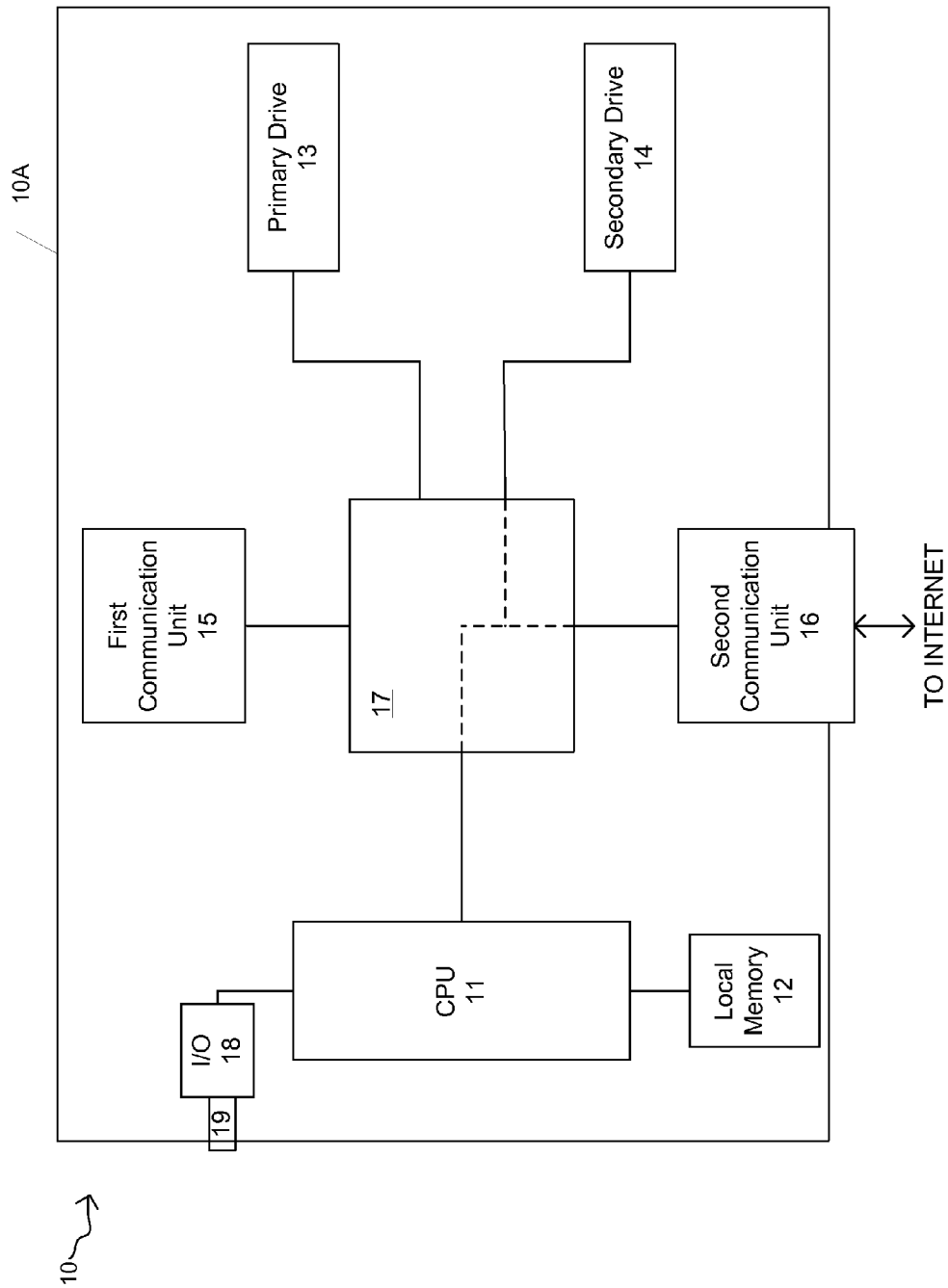
FIG. 4 shows an exemplary block diagram of the computer system of FIG. 1 operating in an open mode, in accordance with one embodiment of the invention.

Conversely, FIG. 4 illustrates one embodiment of the system 10 operating in an open mode, wherein only the secondary drive 14 and the second communication unit 16 are enabled by the hardware controller 17, so as to allow a verified system user to access the internet and/or less secure networks. When operating in the open mode, whatever information is downloaded from the internet will be on the secondary drive only, as both the primary drive 13 and the first communication unit 15 are disabled. Such a feature functions to protect both the contents of the primary drive 14 and the secured network (e.g., company network) from remote attacks.

Although illustrated above as utilizing a CPLD or an FPGA as the hardware controller 17, this is for illustrative purposes only, as virtually any component capable of isolating the device components in the manner described can be utilized. For example, in another embodiment, power to the isolated components can be disconnected by the system, in order to ensure the primary drive cannot be read, written or otherwise accessed while an active internet connection is present. As such, only the secondary drive is available, and the primary drive for all intents and purposes disappears.

In the course of normal operation, it may be necessary for a user to transfer data between the primary and secondary drives. In this regard, so long as no internet connection is present, the system can act to allow full access to both drives upon password verifications as described above. Moreover, whenever information that is contained on the primary drive needs to be transmitted across a less secure network, the user can copy the information from the primary drive to the secondary drive (in protected mode), and then switch the system to open mode for transmission and reception. However, in all cases it is the responsibility of the user, to make sure only safe data is brought into the system when connected to any network. Accordingly, any number of software solutions can also be provided to scan the data from outside before transferring in to the main drive and hence into the system.

However, even if a malicious program gets through (user transferred without knowing) the malicious program can't transfer data from the primary drive to the secondary drive and hence to the internet without the user intervention and hence data can't be "stolen". To prevent modifying and/or erasing the primary drive, any program that is allowed to modify the primary drive has to go through a separate authentication which is set up when the system is setup. This is also user set and verification is in the hardware. This is no different than the write permissions in Unix etc. Such features making it extremely difficult for unauthorized programs to modify the primary drive.

Although described above as reciting particular hardware elements and password lengths and types, this is for illustrative purposes only. In this regard, each of the above described passwords can include any number of different components, bytes and the like, as desirable to a user. Additionally, any number of additional hardware and/or software elements can also be provided to enable the functionality of the inventive concepts disclosed herein.

Accordingly, the above described system and method for protecting data from external threats can function in a novel manner to protect user data and other valuable components from being accessed by an unauthorized user who may have either physical or remote access to the system.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, aspects of the present invention may be embodied as a system, method or computer program product. Accordingly, aspects of the present invention may take the form of an entirely hardware embodiment, or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer system for protecting data from external threats, said system comprising:
    one or more input/output units for receiving a first user password and a second user password;
    a physical key device that is configured to store the second user password, said key device being further configured to physically engage one of the input/output units;
    a local memory configured to store operating instructions;
    a processor that functions to execute the operating instructions from the local memory;
    a primary bulk storage device that is configured to store data;
    a secondary bulk storage device that is also configured to store data;
    a first communication unit;
    a second communication unit; and
    a hardware control unit that is interposed between the processor and each of the primary bulk storage device, the secondary bulk storage device, the first communication unit, and the second communication unit, said hardware control unit being in communication with each of the one or more input/output units and functioning to transition the system between a protected mode and an open mode,
    wherein the hardware control unit is configured to authenticate the second user password contained on the physical key device, and provide system access upon successful authentication, and
    wherein the hardware control unit is further configured to generate a Non Maskable interrupt and to disable access to the system upon determining that the physical key is not physically engaged with one of the one or more input/output units.

2. The system of claim 1, wherein the hardware control unit functions to disable the second communication unit when the system is in the open mode.

3. The system of claim 1, wherein the hardware control unit functions to disable each of the primary bulk storage device, and the first communication unit when the system is in protected mode.

4. The system of claim 1, wherein the hardware control unit is configured to generate a Non Maskable interrupt and to disable access to the system upon unsuccessful authentication.

5. The system of claim 1, wherein the primary and secondary bulk storage devices include a first hard disc drive and a second hard disc drive, respectively.

6. The system of claim 1, wherein the first communication unit includes a first network adapter that is encoded with instructions to facilitate communication between the system and a secured network, and
the second communication unit includes a second network adapter that is encoded with instructions to facilitate communication between the system and at least one of an unsecured network and an internet.

7. The system of claim 1, wherein the hardware control unit includes at least one of a Field-Programmable Gate Array, and a Complex Programmable Logic Device that are configured to allow selective access to the processor by one or more of the primary bulk storage device, the secondary bulk storage device, the first communication unit, and the second communication unit.

8. The system of claim 1, wherein the physical key includes, at least one of a CD ROM, an SD card, and a USB memory device.

9. A method for protecting data from external threats, said method comprising:
providing a computer system that includes
a plurality of input/output units,
a physical key device that is configured to physically engage at least one of the input/output units,
a local memory configured to store operating instructions,
a processor that functions to execute the operating instructions from the local memory;
a primary bulk storage device that is configured to store data,
a secondary bulk storage device that is also configured to store data,
a first communication unit,
a second communication unit, and
a hardware control unit that is interposed between the processor and each of the primary bulk storage device, the secondary bulk storage device, the first communication unit, and the second communication unit, said hardware control unit being in communication with each of the one or more input/output units and functioning to transition the system between a protected mode and an open mode;
receiving a first user password via one of the input/output unit;
authenticating, via the processor, the first user password;
connecting the physical key to another input/output unit;
receiving a second user password from the physical key and providing the same to the hardware control unit;
authenticating, via the hardware control unit, the second user password;
selectively activating one or more of the primary bulk storage device, the secondary bulk storage device, the first communication unit, and the second communication unit, in one of a protected mode and an open mode, and
wherein upon determining that the physical key is not engaged with one of the input/output units, generating a Non Maskable interrupt to disable access to the system.

10. The method of claim 9, wherein the first user password includes a 6-8 character password.

11. The method of claim 9, wherein the second user password includes at least one of a news article, a long passage of words, a picture, and a complex alphanumeric sequence.

12. The method of claim 9, wherein the second user password includes at least 128 bytes.

13. The method of claim 9, wherein authenticating the first user password is performed via software.

14. The method of claim 9, wherein authenticating the second user password is performed via hardware.

15. The method of claim 9, further comprising:
determining that one or more of the authenticating the first user password and authenticating the second user password has failed, and
generating a Non Maskable interrupt to disable access to the system.

16. The method of claim 9, further comprising:
disabling the second communication unit when the system is in the protected mode.

17. The method of claim 9, further comprising:
disabling each of the primary bulk storage device, and the first communication unit when the system is in the open mode.

\* \* \* \* \*